(12) United States Patent
Suzuki

(10) Patent No.: US 6,703,585 B2
(45) Date of Patent: Mar. 9, 2004

(54) ARC WELDING QUALITY EVALUATION APPARATUS

(75) Inventor: Yukimitsu Suzuki, Anjo (JP)

(73) Assignee: Central Motor Wheel Co., Ltd., Anjo (JP)

( * ) Notice: Subject to any disclaimer, the term of this patent is extended or adjusted under 35 U.S.C. 154(b) by 0 days.

(21) Appl. No.: 10/064,953

(22) Filed: Sep. 4, 2002

(65) Prior Publication Data
US 2003/0052107 A1 Mar. 20, 2003

(30) Foreign Application Priority Data
Sep. 20, 2001 (JP) ........................... 2001-287619

(51) Int. Cl.⁷ .............................................. B23K 9/10
(52) U.S. Cl. ............................. 219/130.01; 219/137 PS
(58) Field of Search ....................... 219/130.01, 130.21, 219/130.32, 130.33, 137 PS (56) References Cited

U.S. PATENT DOCUMENTS 4,613,743 A  * 9/1986 Nied et al. ............. 219/130.21
5,676,867 A  * 10/1997 Allen .................... 219/130.01

FOREIGN PATENT DOCUMENTS

JP          9-57442     *  3/1997
JP          10-137938   *  5/1998

* cited by examiner

Primary Examiner—Clifford C. Shaw
(74) Attorney, Agent, or Firm—Jiang Chyun IP Office (57) ABSTRACT

An arc welding quality evaluation apparatus for consumable electrode gas shielded arc welding comprises a heat input detection means 8 for detecting heat input applied to a workpiece to be welded; a welding time detection means 11 for detecting the welding time of the workpiece; a spatter weight detection means 16 for detecting the weight of spatter produced during the welding time of the workpiece; a heat compensation means 17 for compensating for heat loss due to spatter occurring during the welding time of the workpiece; an effective heat input computation means 12 for computing effective heat input per unit welding time, based on detected values of the detection means 8 and 11, and a compensation value of the heat compensation means 17; and a weld quality assessment means 22 for comparing an output of the effective heat input computation means 12 to a reference standard value, and assessing weld quality acceptability based on the degree of separation of the computation means output from the reference standard value.

7 Claims, 8 Drawing Sheets

ARC WELDING QUALITY EVALUATION APPARATUS

CROSS REFERENCE TO RELATED APPLICATIONS

This application claims the priority benefit of Japanese application serial no. 2001-287619, filed Sep. 20, 2001.

BACKGROUND OF INVENTION

1. Field of the Invention

The present invention is related to a weld quality evaluation apparatus for consumable electrode gas shielded arc welding.

2. Background Art

In the past, judgments on the acceptability of weld quality in consumable electrode gas shielded arc welding (hereinafter "arc welding"), were made by inspectors performing after-the-fact external visual inspections to check the uniformity and shape of the bead, and the amount of spatter deposited. In this method, precise pass/fail assessments of weld quality were difficult to achieve due to reliance on qualitative assessments made by different individuals.

A proposed solution to this problem was described in Publication of Unexamined [Japanese] Patent Application No. H10-137938 (hereinafter, "first background art reference"). This proposal uses an arc welding monitoring system in which weld quality acceptability is assessed indirectly from the rate at which the consumable electrode (welding wire) is fed out, and the amount of welding wire supplied.

Another solution was proposed in Unexamined [Japanese] Patent Application No. H9-57442 (hereinafter, "second background art reference"). This reference proposed an arc welding monitoring system in which a number of quantitative characteristics related to arc welding quality are monitored by separate sensors to determine whether the arc welding is being performed according to a prescribed set of conditions.

A problem with the technology of the first reference (JP H10-137938), however, is that in this method it is difficult, based solely on welding wire feed rate and the amount of wire supplied, to assess factors such as (1) whether the optimum amount of molten welding wire metal was deposited;

(2) whether enough welding wire metal had penetrated into the workpiece material to ensure adequate bonding strength after welding; and (3) how much of the spatter generated during welding was wasteful.

Also, in the solution proposed in the second reference (JP H9-57442), a number of quantitative characteristics related to arc welding quality are monitored by separate sensors for sensing welding voltage/current, remaining gas pressure, remaining wire, etc., and welding quality is assessed based on the results of this sensing. Therefore, in this method, although it is possible to assess trends associated with continuous variations in remaining shielding gas pressure, remaining wire, etc., it is difficult to assess welding quality when there are instantaneous changes occurring during welding due to arc interruption phenomena. This can lead to erroneous assessments of arc welding quality.

SUMMARY OF INVENTION

The present invention was devised with the above problem in mind, and it is therefore an object thereof to provide an arc welding quality evaluation apparatus that can make precise welding quality pass/fail decisions, and that does not make erroneous welding quality assessments. The present invention accomplishes the above object through the technical means described below.

That is, to accomplish the above object, an arc welding quality evaluation apparatus according to a first aspect of the present invention is characterized in that in consumable electrode gas-shielded arc welding, wherein a welding voltage is applied between a welding wire and a workpiece to be welded, molten metal droplets from the welding wire are transferred to the workpiece, and that portion of the wire consumed by the transfer of droplets is replenished, for performing continuous arc welding, it comprises a heat input detection means for detecting heat input applied to the workpiece, from the welding voltage applied thereto and welding current supplied thereto; a welding time detection means for detecting workpiece welding time: a spatter weight detection means for detecting the weight of spatter produced during the workpiece welding time; a heat compensation means for compensating for heat loss due to spattering during the workpiece welding time; an effective heat input computation means for computing effective heat input based on detected values of the heat input detection means and welding time detection means, and a heat compensation value of the heat compensation means; and a weld quality assessment means for assessing weld quality acceptability based on the degree of separation of an output of the effective heat input computation means from a reference standard value.

This first aspect of the present invention is based on the fact that weld quality assessment accuracy is closely related to the effective heat input (heat input applied to the workpiece, compensated for heat loss due to spattering). The effective heat input value found to exist during optimum welding is set in advance as the reference standard value. Values output from the effective heat input computation means are then compared to this reference standard value, and welding quality pass/fail decisions are made based on the degree of separation of the values output by the effective heat input computation means from the reference standard value.

Also, a second aspect of the present invention is characterized in that, in a consumable electrode gas shielded arc welding system, it comprises a supplied wire weight detection means for detecting the weight of welding wire supplied, a spatter weight detection means for detecting the weight of spatter produced during the workpiece welding time; a weld metal deposition efficiency computation means for computing efficiency of deposition of welding wire metal on the workpiece, based on values detected by the supplied wire weight detection means and the spatter weight detection means; and a weld quality assessment means for comparing an output value of the weld metal deposition efficiency computation means with a reference standard value, and assessing weld quality acceptability based on the degree of separation of the computation means output value from the reference standard value.

This second aspect of the present invention is based on the fact that weld quality assessment accuracy is closely related to weld metal deposition efficiency (the weight of the welding wire supplied minus the weight of the spatter, all divided by the weight of the wire supplied). The weld metal deposition efficiency found to exist during optimum welding is set in advance as the reference standard value. Values output by the deposition efficiency computation means are then compared to this reference standard value, and welding quality pass/fail decisions are made based on the degree of separation of the values output by the deposition efficiency computation means from the reference standard value.

A third aspect of the present invention is characterized in that, in a consumable electrode gas-shielded arc welding system, it comprises a supplied wire weight detection means for detecting the weight of welding wire supplied; a spatter weight detection means for detecting the weight of spatter produced during the workpiece welding time; a deposited metal weight computation means for computing the weight of welding wire metal deposited on the workpiece, based on values detected by the supplied wire weight detection means and spatter weight detection means; and a welding quality assessment means for comparing an output value of the deposited metal weight computation means with a reference standard value, and assessing weld quality acceptability based on the degree of separation of the output value from the reference standard value.

This third aspect of the present invention is based on the fact that weld quality assessment accuracy is closely related to the weight of the deposited welding wire metal (the weight of the supplied wire minus the weight of the spatter). The weight of the deposited weld metal found to exist during optimum welding is set in advance as the reference standard value. The value output by the deposited metal weight computation means is then compared to this reference standard value, and welding quality pass/fail decisions are made based on the degree of separation of the values output by the deposited metal weight computation means from the reference standard value.

A fourth aspect of the present invention is characterized in that it comprises a welding quality assessment means that computes a molten metal cross-sectional area of a workpiece, using a first conversion diagram for converting an output value of an effective heat input computation means according to the above first aspect to a workpiece molten cross-sectional area, compares the molten metal cross-sectional area to a reference standard value, and assesses weld quality acceptability based on the degree of separation of the molten metal cross-sectional area from the reference standard value.

This fourth aspect of the present invention is based on the fact that effective heat input is essentially directly proportional to the molten metal cross-sectional area of the workpiece. Also, the molten metal cross-sectional area and depth of weld penetration are closely related to weld quality acceptability. Therefore, the effective heat input corresponding to the molten metal cross-sectional area found to exist during optimum welding is set in advance as the reference standard value. Values output by the effective heat input computation means are compared to this reference standard value, and welding quality pass/fail decisions are made based on the degree of separation of the computed values from the reference standard value.

A fifth aspect of the present invention is characterized in that it comprises a welding quality assessment means that computes a deposited metal cross-sectional area of a workpiece, using a second conversion diagram that converts an output value of a deposited metal weight computation means according to the above third aspect to a deposited metal cross-sectional area, compares the deposited metal cross-sectional area to a reference standard value, and assesses weld quality acceptability based on the degree of separation of the deposited metal cross-sectional area from the reference standard value.

This fifth aspect of the present invention is based on the fact that the weight of the deposited metal is essentially directly proportional to the deposited metal cross-sectional area of the workpiece. The acceptability of welding quality is closely related to the deposited metal cross-sectional area. Therefore, the deposited weight corresponding to the deposited metal cross-sectional area found to exist during optimum welding is set in advance as the reference standard value. Values output by the deposited metal weight computation means are compared to this reference standard value, and welding quality pass/fail decisions are made based on the degree of separation of this computation means output from the reference standard value.

A sixth aspect of the present invention is characterized in that it comprises a welding quality assessment means that computes an effective cross-sectional area by subtracting the deposited metal cross-sectional area according to the above fifth aspect from the molten metal cross-sectional area according to the above fourth aspect, compares the effective cross-sectional area to a reference standard value, and assesses weld quality acceptability based on the degree of separation of the effective cross-sectional area from the reference standard value.

A seventh aspect of the present invention is characterized in that, in an arc welding quality evaluation apparatus according to any one of the first through sixth aspects of the invention, it comprises a weld quality assessment means wherein effective heat input, deposited metal weight, molten metal cross-sectional area, deposited metal cross-sectional area, and effective cross-sectional area, as in the first through sixth aspects, are computed as average values over the welding time, each average value is compared to a reference standard value set to the respective average value during optimum welding conditions, and weld quality acceptability is assessed based on the degree of separation of the average value from the reference standard value.

Figure 7:
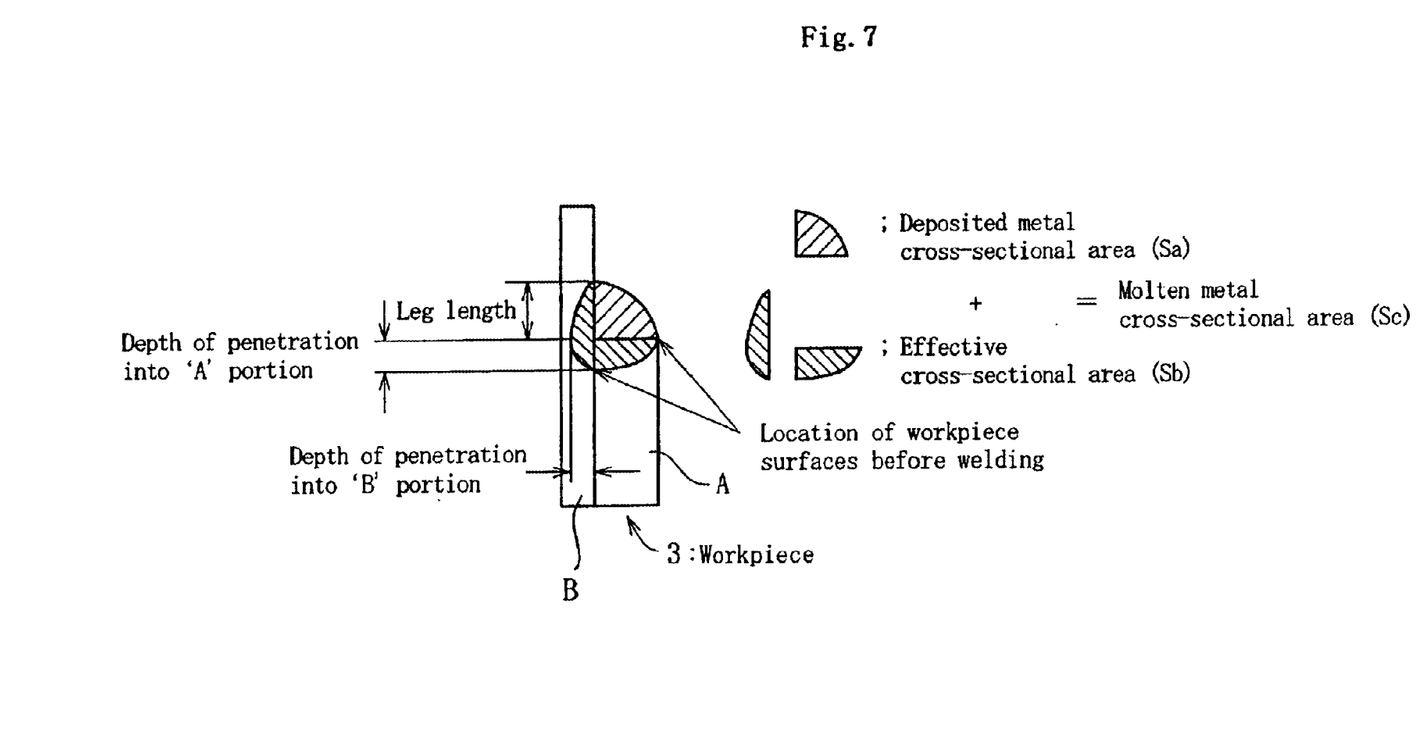
FIG. 7 shows a typical deposited metal cross-sectional area, molten metal cross-sectional area, and effective cross-sectional area.
Figure 8:
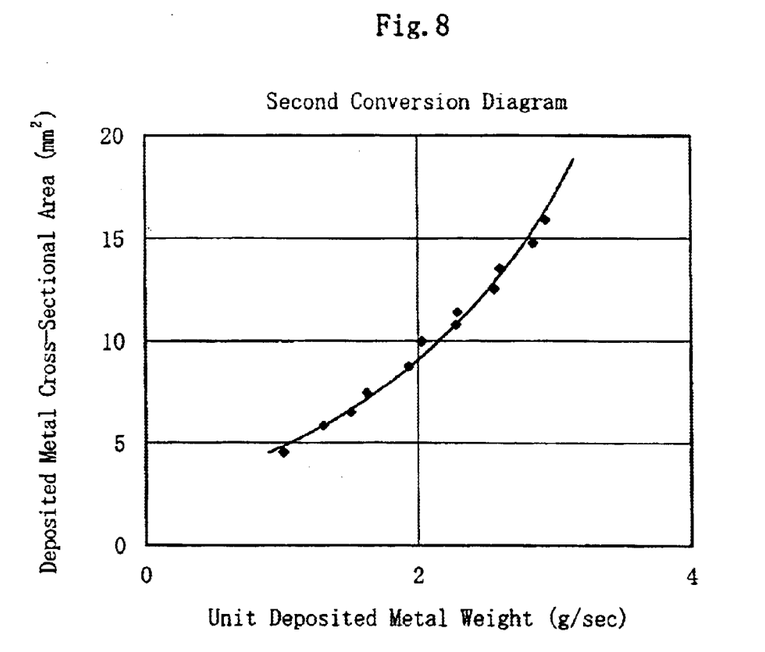
FIG. 8 is a second conversion diagram based on a curve representative of the relationship between experimentally obtained unit deposited metal weight and deposited metal cross-sectional area.
Figure 9:
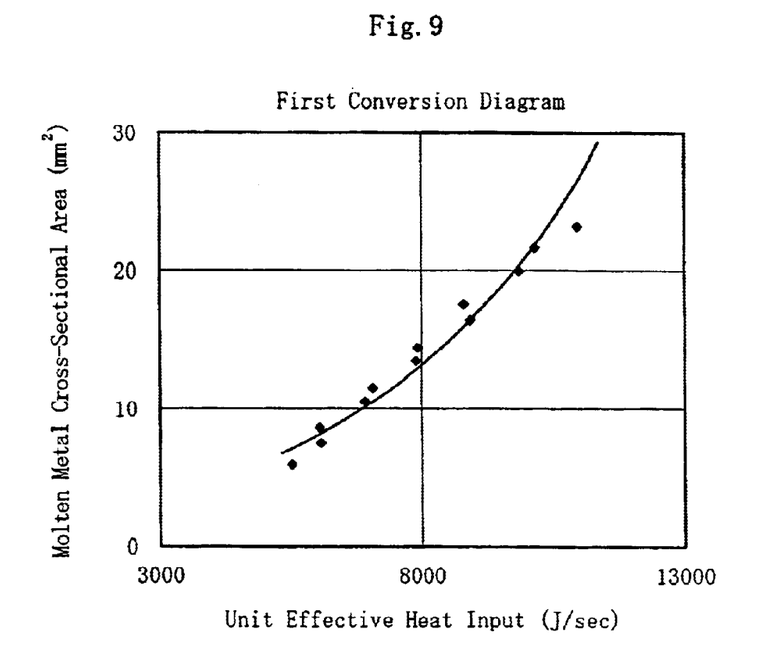
FIG. 9 is a first conversion diagram based on a curve representative of the relationship between experimentally obtained unit effective heat input and molten metal cross-sectional area.

The cross-sectional area of the weld penetration depth and leg length (as indicated in the cross-hatched portions of FIG. 7) is the best indication of welding quality. The cross-sectional area of this portion is designated as the "effective cross-sectional area." This effective cross-sectional area (the cross-sectional area of the penetration of the weld into the workpiece), is the cross-sectional area of the molten metal minus the cross-sectional area of the deposited metal. From a plot of molten metal cross-sectional area vs. effective heat input data obtained in experiments in which effective heat input per unit time is varied over a broad range, a first conversion diagram for converting effective heat input to workpiece molten metal cross-sectional area can be generated. Similarly, from a plot of deposited metal cross-sectional area vs. deposited metal weight data obtained in experiments in which the weight of metal deposited per unit time is changed over a broad range, a second conversion diagram for converting deposited metal weight to workpiece deposited metal cross-sectional area can be generated (FIGS. 8 and 9). The difference between the molten metal and deposited metal cross-sectional areas, as obtained from these two conversion diagrams, is the effective cross-sectional area.

However, because effective heat input and deposited metal weight tend to vary within a narrow range during the welding time, results of computations based on instantaneous values of these variables may not always match reference standard values for good weld quality. However, when values of effective heat input and deposited metal weight, as well as values of the parameters that are computed based on them (molten metal cross-sectional area, deposited metal cross-sectional area, and effective cross-sectional area) are computed as averages of those values over the welding time, the values conform to actual conditions, and provide realistic results.

BRIEF DESCRIPTION OF DRAWINGS

These and other features, aspects, and advantages of the present invention will become apparent with reference to the following description, claims, and accompanying drawings, where:

DETAILED DESCRIPTION

Figure 1:
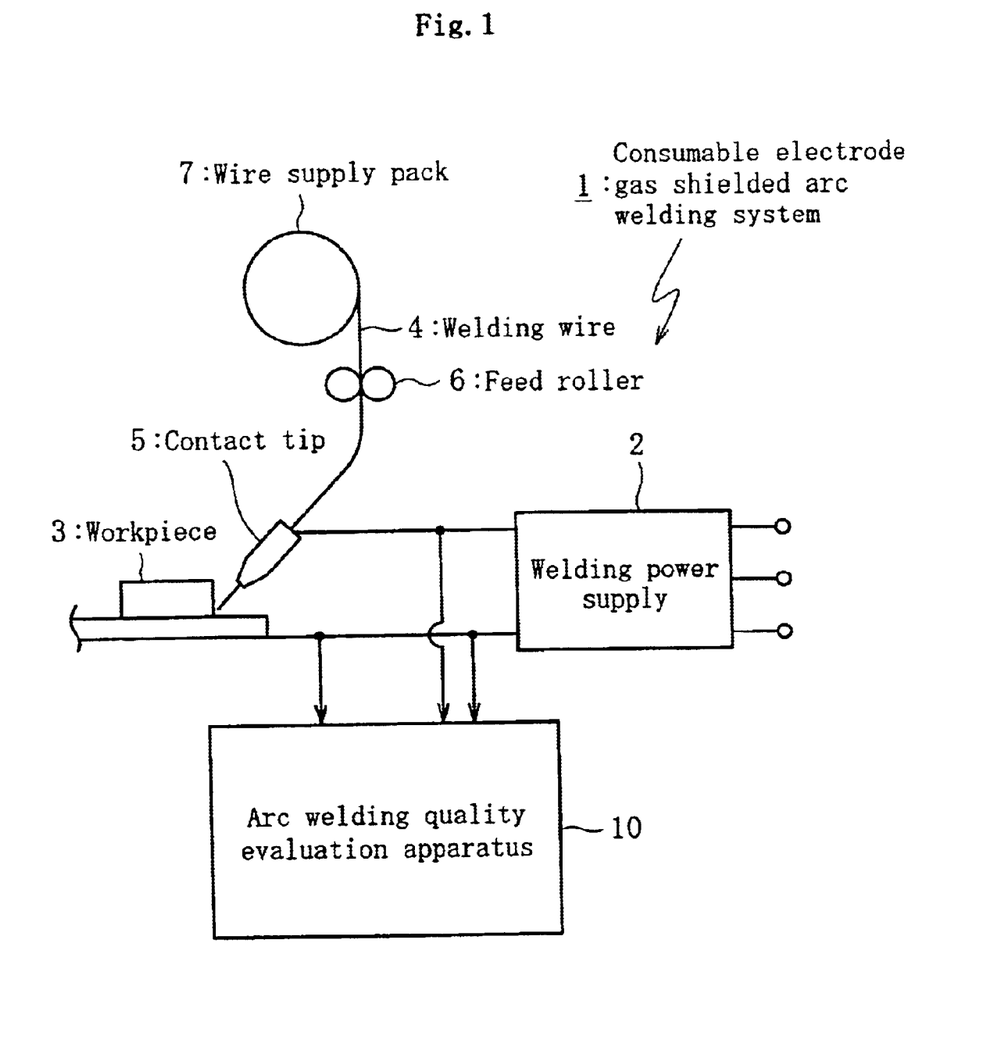
FIG. 1 is a simplified block diagram showing the overall configuration of the arc welding quality evaluation apparatus in one embodiment of the present invention.

A preferred mode of the invention will now be described with reference to FIG. 1 through FIG. 1 is a simplified configuration diagram of an arc welding quality evaluation apparatus in one embodiment of the present invention. Shown in FIG. 1 is a consumable electrode gas shielded arc welding system (hereinafter "arc welding system") 1, comprising a welding power supply 2, a workpiece 3 having a lap joint with fillet welds, and a welding wire 4 (the welding electrode). The welding power supply 2 is a controlled-output (high-speed control) inverter power supply in which it is possible to control the waveforms of the welding voltage and current.

Welding wire 4 is supplied from a wire supply pack 7 in which it is wound into a coil. The forward tip of the welding wire 4 is fed out toward the workpiece 3 at a prescribed rate, passing through a feed roller 6, and a welding torch contact tip 5, which holds it in place.

Figure 2:
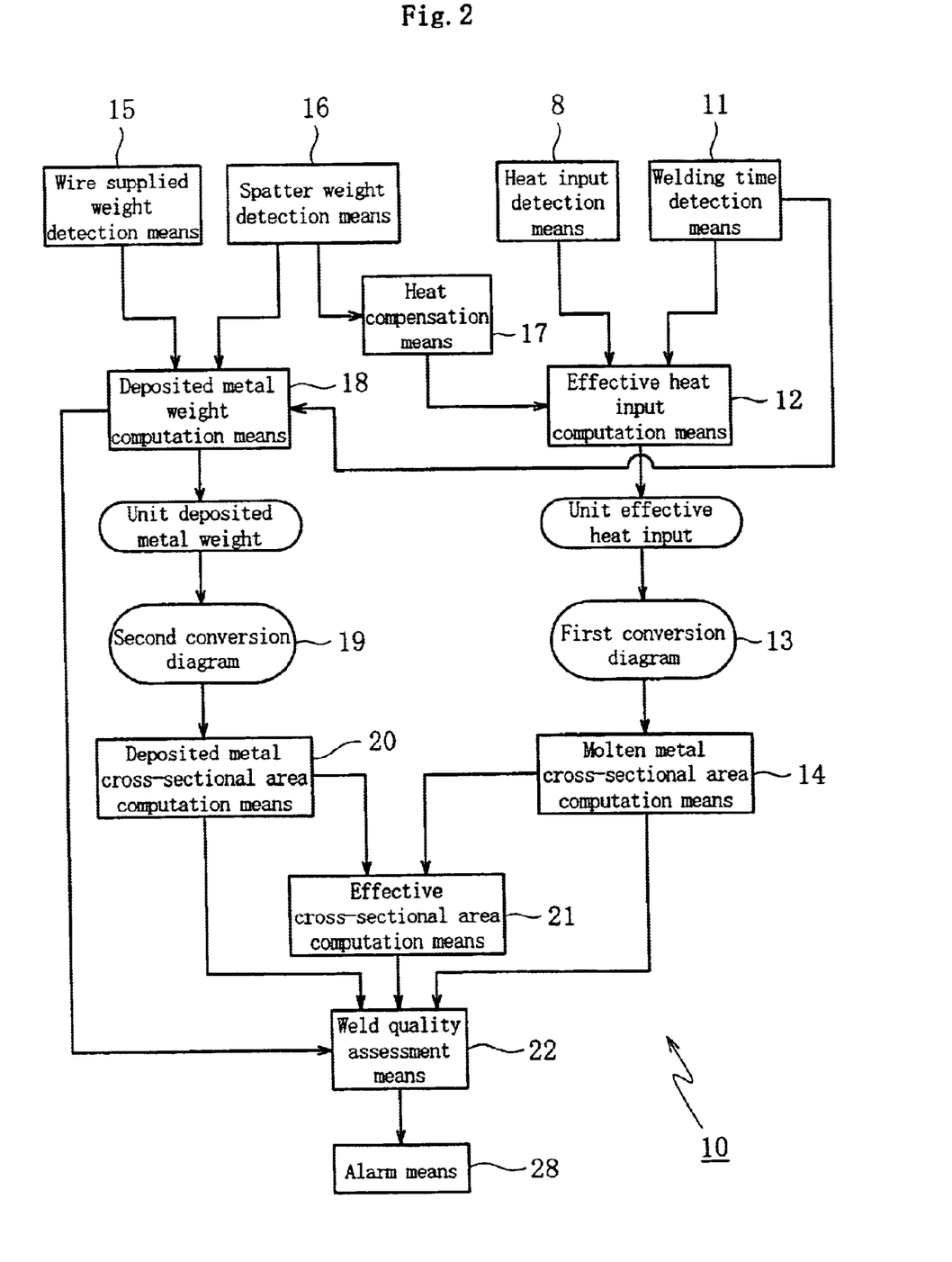
FIG. 2 is a block diagram showing the basic configuration of the arc welding quality evaluation apparatus of FIG. 1.

FIG. 2 is a block diagram of a basic configuration for the arc welding quality evaluation apparatus 10 of the present invention. The heat input detection means 8 shown in this diagram computes total heat input by calculating the product of the integrals of the welding voltage and welding current as detected by a welding voltage detection circuit 41 and welding current detection circuit 42, respectively, shown in FIG. 3. Also shown in FIG. 2 is a welding time detection means 11, which measures the time t (in seconds) between start-of-weld and end-of-weld.

A spatter weight detection means 16 is capable of determining spatter weight (the weight of spattered material) by either of two methods: (1) scavenging the spatter after welding and measuring its weight, or (2) calculating it as (the pre-weld weight of workpiece 3)+(the weight of welding wire 4 consumed) (the post-weld weight of workpiece A heat compensation means 17 calculates heat loss due to spattering, based on the spatter weight.

An effective heat input computation means 12 computes the total heat input to one workpiece 3 based on values output by the heat input detection means 8, the welding time detection means 11, and the heat compensation means 17. In other words, the result of the computation made by the effective heat input computation means 12 is the total heat input minus the ineffective heat dissipated by spattering. When computing the above, the effective heat input computation means 12 also computes unit effective heat input per unit time.

Item 13 is a first conversion diagram for converting unit effective heat input to molten metal cross-sectional area. Specifically, as shown in FIG. 9, the first conversion diagram is a graph of the correlation between unit effective heat input (on the horizontal axis), and molten metal cross-sectional area (on the vertical axis). This relationship is stored in the ROM 31 of FIG. 3 as a function. A molten metal cross-sectional area computation means 14 uses this first conversion diagram to compute molten metal cross-sectional area from unit effective heat input. As shown in FIG. 7, the molten metal cross-sectional area Sc is sum of the deposited metal cross-sectional area Sa and the effective cross-sectional area Sb (the molten portion of the workpiece 3).

A supplied wire weight detection means 15 detects the weight of welding wire supplied for each bead on the workpiece 3. It does this by multiplying the weight per unit length of the wire by the length of wire fed out, as measured directly by a laser sensor located at the point where the wire exits the feed roller 6. Because extra space exists inside a wire conduit that extends between the feed roller 6 (FIG. 1) and contact tip 5 (not illustrated), wire length could be measured more accurately by a sensor placed where the wire enters the contact tip 5. Because of space limitations in the vicinity of the welding torch, however, the measurement is performed by a laser sensor (not illustrated) placed at the wire exit side of the feed roller Another method considered for detecting the amount (length) of wire supplied was to detect a pulse signal from the wire feed motor (not illustrated) that drives the feed roller 6. Because measurements by this method are in error by an amount equal to the amount of wire slippage in the feed roller 6, however, the above non-contact laser sensor method was selected.

Item 18 is a deposited metal weight computation means that performs a computation in which it subtracts the spatter weight calculated by a spatter weight detection means 16 from the supplied wire weight calculated by the supplied wire weight detection means 15. The result of this computation (the deposited metal weight) is the weight of the metal actually deposited on the workpiece. An assessment of welding stability can be obtained by comparing this deposited metal weight to a reference standard value: The higher the deposited metal weight, the lower the spatter, which is indicative more stable and efficient arc phenomena.

Moreover, in addition to (or instead of) providing the deposited metal weight computation means 18, a metal deposition efficiency computation means that computes weld metal deposition efficiency by subtracting the spatter weight from the wire supplied weight and dividing the difference by the wire supplied weight may be provided. As was done with the deposited metal weight, an assessment of welding stability can be obtained comparing this metal deposition efficiency figure with a reference standard value. As it computes the deposited metal weight, the deposited metal weight computation means 18 also computes the weight of wire deposited on the workpiece 3 per unit welding time (unit metal deposition weight).

Item 19 is a second conversion diagram. Specifically, as shown in FIG. 8, it constitutes a graph of the correlation between unit deposited metal weight (on the horizontal axis), and deposited metal cross-sectional area (on the vertical axis). This relationship is stored in the ROM 31 of FIG. 3 as a function. A deposited metal cross-sectional area computation means 20 uses this second conversion diagram to compute deposited metal cross-sectional area from unit deposited metal weight. In FIG. 7a, the deposited metal cross-sectional area is shown as the portion Sa: the cross-sectional area of the solidified build-up of molten metal droplets on the workpiece 3.

The experiments in which the data in FIGS. 8 and 9 were obtained were conducted under the following conditions:Welding method: Carbon dioxide gas arc weldingType of weld: lap joint fillet weldWelding current: 300 410 AWelding rate: 60 cm/minAn effective cross-sectional area computation means 21 computes effective cross-sectional area by subtracting the deposited metal cross-sectional area computed by the deposited metal cross-sectional area computation means 20 from the molten metal cross-sectional area computed by the molten metal cross-sectional area computation means 14.

A weld quality assessment means 22 assesses weld quality acceptability by comparing the effective cross-sectional area computed by the effective cross-sectional area computation means 21 to a reference standard. When weld quality is determined to be unacceptable by the weld quality assessment means 22, a warning means 28 issues a weld quality defect alert through audible or visual means, and prevents the workpiece 3 having unacceptable weld quality from being passed downstream to subsequent processes.

Figure 3:
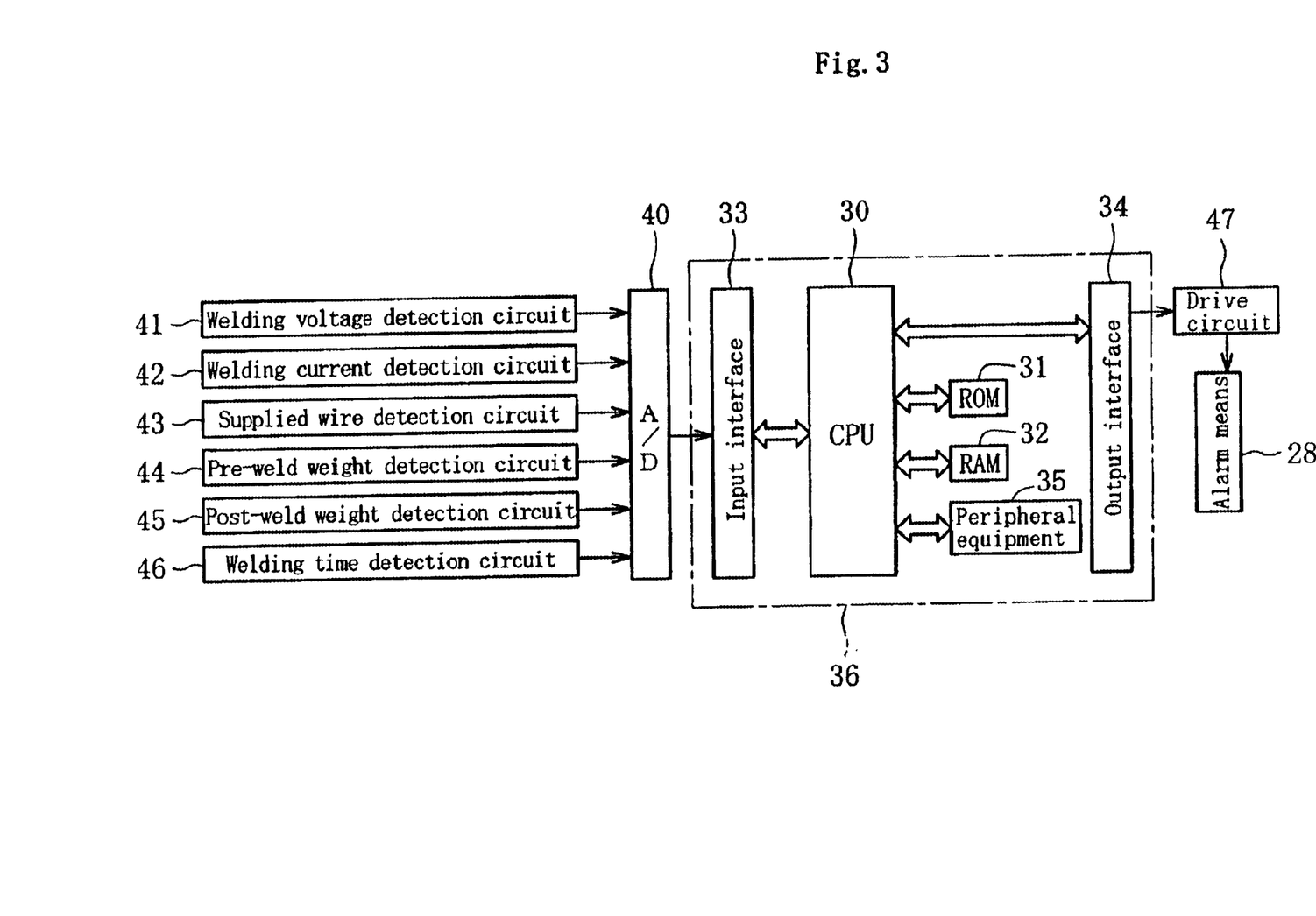
FIG. 3 is a block diagram of the basic circuit of the arc welding quality assessment apparatus of FIG. 1.

The basic circuit of the arc welding quality evaluation apparatus 10 in the arc welding system 1 described above will be described with reference to the block diagram of FIG. 3. The system, as shown in FIG. 3, includes processor (CPU) 30, a read-only memory (ROM) 31, a random-access memory (RAM) 32, an input interface 33, an output interface 34, peripherals (keyboard, monitor, printer, etc.) 35 (all of the above items being included in a controller 36), an A/D converter 40, a welding voltage detection circuit 41, a welding current detection circuit 42, a wire supplied detection circuit 43, a pre-weld weight detection circuit 44, a post-weld weight detection circuit 45, a welding time detection circuit 46, and a drive circuit 47 for driving an alarm means 28.

The welding voltage detection circuit 41 senses welding voltage between the contact tip 5 and the workpiece 3, and the welding current detection circuit 42 is connected to the workpiece 3 for sensing welding current.

Together, the welding voltage detection circuit 41 and welding current detection circuit 42 make up the heat input detection means 8. Similarly, the spatter weight detection means 16 is made up of the pre-weld weight detection circuit 44 and the post-weld weight detection circuit 45; the supplied wire weight detection means 15 is constituted of the wire supplied detection circuit 43: and the welding time detection means 11 is constituted of the welding time detection circuit 46.

Figure 4:
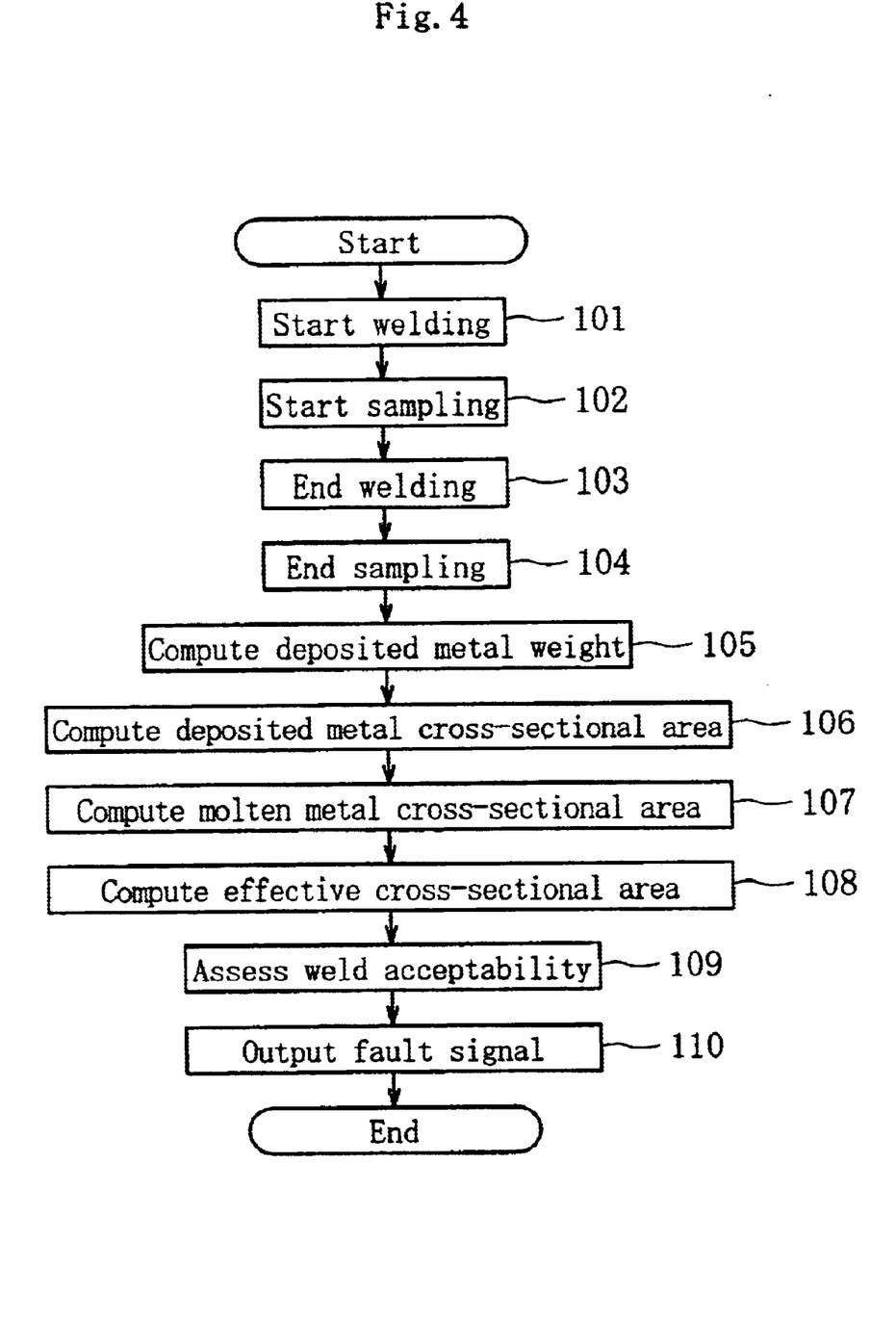
FIG. 4 is a simplified process flow chart showing an overview of the processing of critical characteristics.
Figure 5:
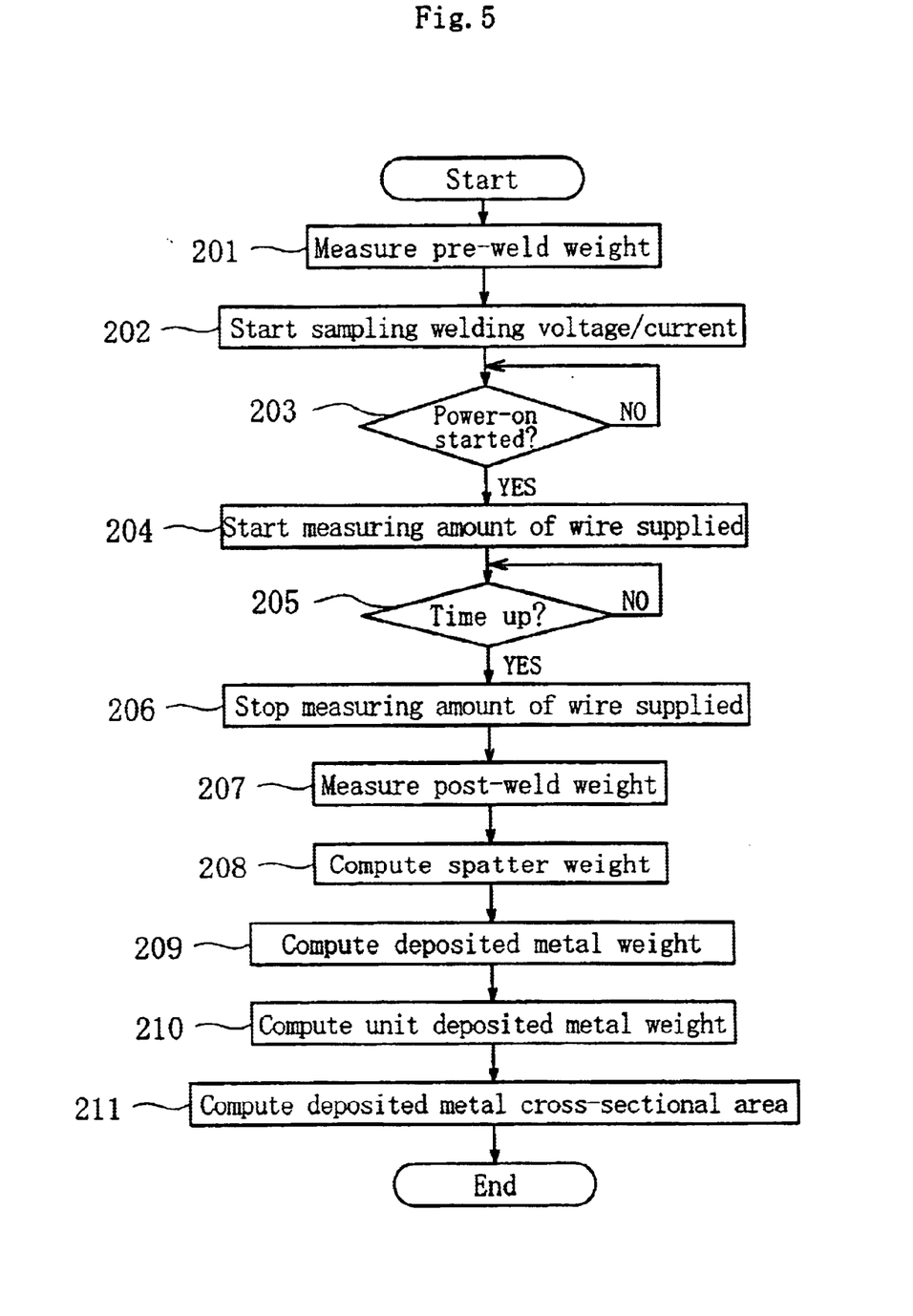
FIG. 5 is a process flow chart for computation of the deposited metal weight and deposited metal cross-sectional area.
Figure 6:
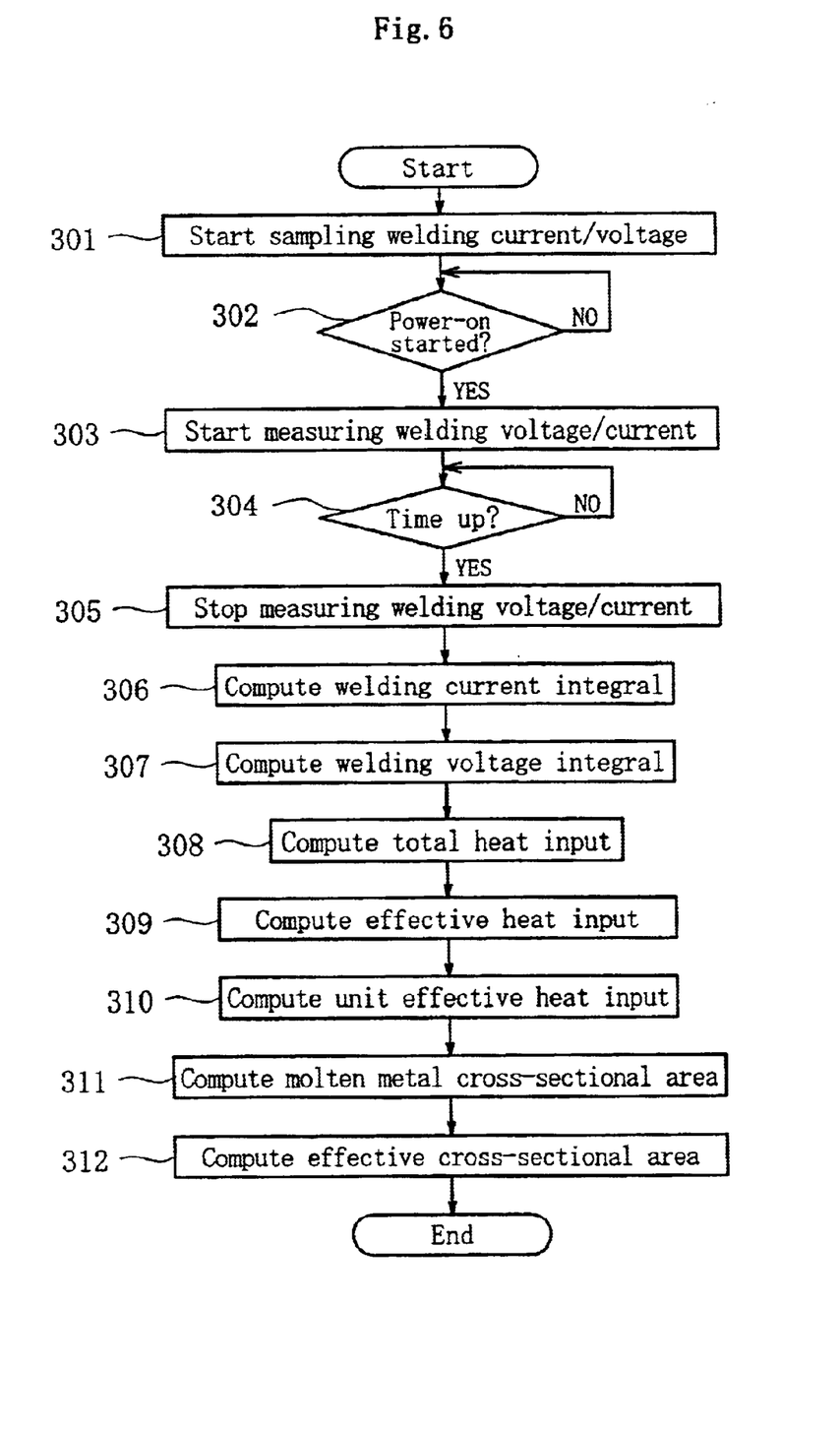
FIG. 6 is flow chart for computation of effective heat input, molten metal cross-sectional area, and effective cross-sectional area.

Next, the process for pass/fail assessment of weld acceptability will be described with reference to the flow charts of FIGS. 4 6. FIG. 4 shows an overview process flow, and detailed flow charts are shown in FIG. 5 and FIG. 6. The assessment program that executes the processes shown in these flow charts is stored in the memory 31 (ROM) of FIG. 3. As shown in FIG. 4, sampling is initiated by the start of welding (Steps 101 and 102) and ends when welding ends (Steps 103 and 104). Then, from the weight of the wire supplied and the weight of the spatter produced, the weight of the deposited metal, the cross-sectional area of the deposited metal, the cross-sectional area of the molten metal, and the effective cross-sectional area, in that order, are computed (Steps 105 108). Each of these computed values is then compared with a threshold value, and a weld acceptability pass/fail decision is made, based on the amount of separation between the compared values (109). If the amount of separation exceeds a reference standard value, a fault signal is output (Step 110).

Next, the process flow from the start of sampling through computation of the weight and cross-sectional area of the deposited metal will be described, with reference to FIG. 5. First, the pre-weld weight of the workpiece is measured (Step 201). Next, the sampling of welding current and welding voltage is started (Step 202), and execution determines whether power-on has started (Step 203). If it has, measurement of supplied wire weight begins (Step 204). Execution then determines if time-up has occurred (Step 205)[, and if it has, the amount (weight) of wire supplied is computed from the wire diameter (Step 206)]. Next the post-weld weight of the workpiece is measured (Step 207), and the weight of the spatter is computed from the difference between the pre- and post-weld workpiece weights (Step 208). In Step 209, the weight of the deposited metal is calculated from the supplied wire weight and spatter weight. In Step 210, the unit deposited metal weight is computed from the welding time, and in Step 211, the second conversion diagram is used to compute the cross-sectional area of the deposited metal from the unit deposited metal weight.

FIG. 6 shows the process flow from the start of sampling through the computation of effective heat input, molten metal cross-sectional area, and effective cross-sectional area. First, sampling of welding voltage and current is started (Step 301), and execution determines whether power-on has started (Step 302). If it has, measurement of welding current and voltage during welding time is started (Step 303). Execution then determines if time-up has occurred (Step 304), and if it has, measurement of welding current and voltage during welding time is ended (Step 305). Next the integrals of welding voltage and current over the welding time are computed (Steps 306 and 307), and the total heat input is computed from the product of the voltage and current integrals (Step 308). The effective heat input is then computed by subtracting the ineffective heat dissipated due to spattering from this total heat input (Step 309), the unit effective heat input is computed from the welding time (Step 310), and the first conversion diagram is used to compute the molten metal cross-sectional area from the unit effective heat input (Step 311). Next, the effective cross-sectional area is computed from the deposited metal cross-sectional area (Step 312).

The values of the critical characteristics computed as summarized above are each compared with a reference standard value to make a pass/fail assessment of welding stability, and an alarm issued if a "fail" assessment is rendered. When this happens, the operation of the welding line may be immediately halted to prevent poor quality welds from being passed along to subsequent processes, and troubleshooting and repair of the welding equipment can be performed. As soon as corrective actions are completed, the line can be returned to operation.

In the past, pass/fail assessments of arc phenomena stability during welding were based on after-the-fact visual inspections of the bead exterior. Although this made it possible to perform qualitative assessments of welding instability due to bead compression caused by breaks in the arc, or excessive spatter caused by extended short-circuiting, and also to perform qualitative assessments as to the uniformity of the bead exterior, it was difficult to perform any assessment, either qualitative or quantitative, that included the inside of the workpiece. In addition, quantitative weld quality assessments based on average values of deposited metal cross-sectional area, molten metal cross-sectional area, and effective cross-sectional area would have been next to impossible without cutting, polishing or etching the bead in several places, and because since this required cutting through the welded portion of the workpiece, any accurate quality assessment of the inside of the workpiece was essentially impossible.

In contrast to this, in the present invention the weight of the spatter is computed from the difference in the weight of the workpiece 3 before and after welding, and the weight of the wire supplied; the molten metal cross-sectional area is computed from the unit effective heat input to the workpiece 3 per unit time, with the lost weight as a reference; and the deposited metal cross-sectional area is computed from the weight of molten metal droplets deposited on the workpiece 3 per unit time (which is the unit deposited metal weight), the effective cross-sectional area is computed from the molten metal cross-sectional area and deposited metal cross-sectional area, and each of the computed values is compared to a reference standard value in order to assess weld quality, including the internal portion of the weld. Therefore, the suitability of the internal structure of the welded portion of the workpiece without cutting it. The values of unit effective heat input and unit deposited metal weight that are used for this are the average values of those variables over the welding time.

Although a preferred mode for implementing the present invention was described above, the present invention is not limited to this mode. A wide variety of modifications to the invention are in fact possible. For example, although in the mode described above, weld quality was assessed by comparing effective cross-sectional area to a reference standard value (as in the sixth aspect of the present invention, as described above), average values, over the welding time, of effective heat input, deposited metal weight, molten metal cross-sectional area, deposited metal cross-sectional area, or effective cross-sectional area could instead have been computed, and the computed value compared to the corresponding reference standard value obtained during welding performed under optimum conditions (as in the seventh aspect of the invention, as described above)

The present invention provides the following advantages:

According to a first aspect of the present invention, a compensation means compensates for heat loss due to spattering. Because of this, the effective heat input to the workpiece in arc welding can be accurately determined, and precise evaluation of weld quality acceptability can therefore be performed.

According to a second aspect of the present invention, weld quality acceptability can be evaluated from the efficiency of metal deposition on the workpiece.

According to a third aspect of the present invention, weld quality acceptability can be evaluated from the weight of welding wire metal deposited on the workpiece.

According to a fourth aspect of the present invention, weld quality acceptability can be evaluated by converting effective heat input to molten metal cross-sectional area.

According to a fifth aspect of the present invention, weld quality acceptability can be evaluated by converting deposited metal weight to deposited metal cross-sectional area.

According to a sixth aspect of the present invention, weld quality acceptability can be evaluated based on effective cross-sectional area, as computed from molten metal cross-sectional area and deposited metal cross-sectional area.

According to a seventh aspect of the present invention, weld quality acceptability can be evaluated by computing average values, over the welding time, of effective heat input, deposited metal weight, molten metal cross-sectional area, deposited metal cross-sectional area, and effective cross-sectional area, and comparing each computed value to its respective reference standard value.

What is claimed is:

1. An arc welding quality evaluation apparatus suitable for a consumable electrode gas-shielded arc welding, wherein a welding voltage is applied between a welding wire and a workpiece to be welded, molten metal droplets from the welding wire are transferred to the workpiece, and that portion of the wire consumed by the transfer of droplets is replenished, for performing continuous arc welding, the apparatus comprising:

a heat input detection means for detecting a heat input applied to the workpiece, from the welding voltage applied thereto and a welding current supplied thereto;

a welding time detection means for detecting a workpiece welding time;

a spatter weight detection means for detecting a weight of spatter produced during the workpiece welding time;

a heat compensation means for compensating for a heat loss due to spattering during the workpiece welding time;

an effective heat input computation means for computing an effective heat input based on detected values of the heat input detection means and welding time detection means, and a heat compensation value of the heat compensation means; and a weld quality assessment means for assessing a weld quality based on the degree of separation of an output of the effective heat input computation means from a reference standard value.

2. The arc welding quality evaluation apparatus of claim 1, wherein the weld quality assessment means computes a molten metal cross-sectional area of the workpiece, using a first conversion diagram for converting an output value of the effective heat input computation means to a workpiece molten cross-sectional area, compares the molten metal cross-sectional area to a molten reference standard value, and assesses weld quality acceptability based on the degree of separation of the molten metal cross-sectional area from the molten reference standard value.

3. The arc welding quality evaluation apparatus of claim 2, further comprising:

a supplied wire weight detection means for detecting a weight of welding wire supplied; and a deposited metal weight computation means for computing a weight of welding wire metal deposited on the workpiece, based on values detected by the supplied wire weight detection means and spatter weight detection means;

wherein the weld quality assessment means computes a deposited metal cross-sectional area of the workpiece, using a second conversion diagram that converts an output value of the deposited metal weight computation means to a deposited metal cross-sectional area, compares the deposited metal cross-sectional area to a deposited reference standard value, and assesses weld quality acceptability based on the degree of separation of the deposited metal cross-sectional area from the deposited reference standard value;

wherein the weld quality assessment means computes an effective cross-sectional area by subtracting the deposited metal cross-sectional area from the molten metal cross-sectional area, compares the effective cross-sectional area to an area reference standard value, and assesses weld quality acceptability based on the degree of separation of the effective cross-sectional area from the area reference standard value.

4. The arc welding quality evaluation apparatus of claim 3, wherein the weld quality assessment means, the heat input, the weight of welding wire metal deposited on the workpiece, the molten metal cross-sectional area, the deposited metal cross-sectional area, and the effective cross-sectional area, are computed as average values over tho workpiece welding time, each average value is compared to a reference standard value set to the respective average value during optimum welding conditions, and weld quality acceptability is assessed based on the degree of separation of the average value from the reference standard value.

5. An arc welding quality evaluation apparatus suitable for a consumable electrode gas-shielded arc welding, wherein a welding voltage is applied between a welding wire and a workpiece to be welded, molten metal droplets from the welding wire are transferred to the workpiece, and that portion of the wire consumed by the transfer of droplets is replenished, for performing continuous arc welding, the apparatus comprising:

a supplied wire weight detection means for detecting a weight of welding wire supplied;

a spatter weight detection means for detecting a weight of spatter produced during the workpiece welding time;

a weld metal deposition efficiency computation means for computing an efficiency of deposition of welding wire metal on the workpiece, based on values detected by supplied wire weight detection means and the spatter weight detection means;

a weld quality assessment means for comparing an output value of the weld metal deposition efficiency computation means with a reference standard value, and assessing a weld quality acceptability based on the degree of separation of the computation means output value from the reference standard value.

6. An arc welding quality evaluation apparatus suitable for a consumable electrode gas-shielded arc welding, wherein a welding voltage is applied between a welding wire and a workpiece to be welded, molten metal droplets from the welding wire are transferred to the workpiece, and that portion of the wire consumed by the transfer of droplets is replenished, for performing continuous arc welding, the apparatus comprising:

a supplied wire weight detection means for detecting a weight of welding wire supplied;

a spatter weight detection means for detecting a weight of spatter produced during a workpiece welding time;

a deposited metal weight computation means for computing a weight of welding wire metal deposited on the workpiece, based on values detected by the supplied wire weight detection means and spatter weight detection means; and a weld quality assessment means for comparing an output value of the deposited metal weight computation means with a reference standard value, and assessing a weld quality acceptability based on the degree of separation of the output value from the reference standard value.

7. The are welding quality evaluation apparatus of claim 6, wherein the weld quality assessment means computes a deposited metal cross-sectional area of the workpiece, using a second conversion diagram that converts an output value the deposited metal weight computation means to a deposited metal cross-sectional area, compares the deposited metal cross-sectional area to a deposited reference standard value, and assesses weld quality acceptability based on the degree of separation of the deposited metal cross-sectional area from the deposited reference standard value.

* * * * *